US010651947B2

(12) United States Patent
Shen et al.

(10) Patent No.: US 10,651,947 B2
(45) Date of Patent: May 12, 2020

(54) COHERENT DETECTION WITH REMOTELY DELIVERED LOCAL OSCILLATORS

(71) Applicant: Futurewei Technologies, Inc., Plano, TX (US)

(72) Inventors: Xiao Andy Shen, San Bruno, CA (US); An Li, Santa Clara, CA (US); Hongzhen Wei, Pleasanton, CA (US); Samina Chowdhury, San Jose, CA (US); Feng Zhang, San Jose, CA (US); YuSheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/900,233

(22) Filed: Feb. 20, 2018

(65) Prior Publication Data
US 2019/0260476 A1 Aug. 22, 2019

(51) Int. Cl.
*H04B 10/60* (2013.01)
*H04B 10/61* (2013.01)
*H04B 7/0413* (2017.01)

(52) U.S. Cl.
CPC ......... *H04B 10/614* (2013.01); *H04B 7/0413* (2013.01); *H04B 10/615* (2013.01); *H04B 10/60* (2013.01)

(58) Field of Classification Search
CPC .. H04B 10/614; H04B 7/0413; H04B 10/615; H04B 10/60; H04B 10/6166
USPC .................................................. 398/202–214
See application file for complete search history.

(56) References Cited

U.S. PATENT DOCUMENTS

| 5,060,312 A  | * | 10/1991 | Delavaux  | H04B 10/2572 |
|              |   |         |           | 398/204      |
| 5,323,258 A  | * | 6/1994  | Tsushima  | H04B 10/61   |
|              |   |         |           | 398/152      |
| 7,809,284 B2 | * | 10/2010 | Kaneda    | H04B 10/61   |
|              |   |         |           | 398/203      |
| 8,488,975 B2 | * | 7/2013  | Oda       | H04B 10/2569 |
|              |   |         |           | 398/102      |
| 8,538,277 B2 | * | 9/2013  | Nagarajan | G02B 6/12004 |
|              |   |         |           | 398/203      |

(Continued)

FOREIGN PATENT DOCUMENTS

| CN | 106921441 A   | 7/2017 |
| WO | 2016066033 A1 | 5/2016 |

(Continued)

OTHER PUBLICATIONS

Kazovsky, "Phase- and Polarization-Diversity Coherent Optical Techniques," Journal of Lightwave Technology, vol. 7, No. 2, Feb. 1989, pp. 279-292.

(Continued)

*Primary Examiner* — Dibson J Sanchez
(74) *Attorney, Agent, or Firm* — Conley Rose, P.C.

(57) ABSTRACT

An integrated coherent receiver that is configured to receive an optical signal and receive a local oscillator (LO) source from a remote location. The integrated coherent receiver is configured to extract phase and frequency information carried by the optical signal using the LO source from the remote location.

21 Claims, 9 Drawing Sheets

(56) References Cited

U.S. PATENT DOCUMENTS

| | | | | |
|---|---|---|---|---|
| 8,571,423 B2* | 10/2013 | Winzer | H04J 14/06 | 398/208 |
| 8,588,560 B2* | 11/2013 | Sakamaki | H04B 10/60 | 385/14 |
| 9,235,100 B1* | 1/2016 | Kaplan | G02F 1/225 | |
| 9,716,552 B2* | 7/2017 | Doerr | H04B 10/40 | |
| 10,014,953 B2* | 7/2018 | Ogawa | G02B 6/125 | |
| 2004/0096143 A1* | 5/2004 | Shpantzer | G02B 6/12004 | 385/16 |
| 2007/0206963 A1* | 9/2007 | Koc | H04B 10/61 | 398/202 |
| 2008/0152362 A1* | 6/2008 | Koc | H04B 10/61 | 398/205 |
| 2008/0159756 A1* | 7/2008 | Cheng | H03F 1/0277 | 398/210 |
| 2009/0324224 A1* | 12/2009 | Xie | H04B 10/60 | 398/65 |
| 2010/0028011 A1* | 2/2010 | Kaneda | H04B 10/61 | 398/115 |
| 2010/0054761 A1* | 3/2010 | Chen | H04B 10/60 | 398/212 |
| 2010/0074632 A1* | 3/2010 | Zhou | H04B 10/2513 | 398/208 |
| 2010/0260504 A1* | 10/2010 | Takahara | H04B 10/5053 | 398/152 |
| 2010/0303476 A1* | 12/2010 | Barton | H04B 10/505 | 398/212 |
| 2011/0064422 A1* | 3/2011 | Kim | G02B 6/12004 | 398/214 |
| 2011/0129213 A1* | 6/2011 | Painchaud | H04B 10/676 | 398/16 |
| 2011/0229127 A1* | 9/2011 | Sakamoto | H04B 10/60 | 398/25 |
| 2011/0243561 A1* | 10/2011 | Li | H04B 10/611 | 398/65 |
| 2011/0255870 A1* | 10/2011 | Grigoryan | H04B 10/548 | 398/65 |
| 2012/0002979 A1* | 1/2012 | Xie | H04B 10/611 | 398/208 |
| 2012/0008951 A1* | 1/2012 | Mikami | H04B 10/613 | 398/65 |
| 2012/0207474 A1* | 8/2012 | Inoue | H04B 10/60 | 398/65 |
| 2013/0058649 A1* | 3/2013 | Li | H04B 10/2572 | 398/43 |
| 2013/0183034 A1* | 7/2013 | Zhang | H04L 25/03012 | 398/46 |
| 2013/0188971 A1* | 7/2013 | Painchaud | H04B 10/612 | 398/214 |
| 2013/0302041 A1* | 11/2013 | Matsui | H04B 10/6971 | 398/208 |
| 2013/0336665 A1* | 12/2013 | Suzuki | H04B 10/611 | 398/208 |
| 2014/0153931 A1* | 6/2014 | Doerr | H04B 10/505 | 398/135 |
| 2014/0186024 A1* | 7/2014 | Randel | H04B 10/614 | 398/25 |
| 2014/0241722 A1* | 8/2014 | Xie | H04B 10/532 | 398/65 |
| 2014/0286651 A1* | 9/2014 | Takechi | H04B 10/614 | 398/208 |
| 2014/0348517 A1* | 11/2014 | Shibata | G02B 6/4286 | 398/214 |
| 2015/0063378 A1* | 3/2015 | Nebendahl | H04B 10/614 | 370/537 |
| 2015/0063810 A1* | 3/2015 | Hayami | H04J 14/06 | 398/65 |
| 2015/0117872 A1* | 4/2015 | Lyubomirsky | H04J 14/06 | 398/205 |
| 2015/0139667 A1* | 5/2015 | Takeuchi | G02F 1/0147 | 398/214 |
| 2015/0155952 A1* | 6/2015 | Lach | H04J 14/021 | 398/201 |
| 2015/0205047 A1* | 7/2015 | Yamanashi | G02B 6/126 | 385/14 |
| 2015/0256267 A1* | 9/2015 | Randel | H04B 10/6161 | 398/208 |
| 2015/0280856 A1* | 10/2015 | Nakashima | H04B 10/614 | 398/65 |
| 2016/0020857 A1* | 1/2016 | Jia | H04L 25/03019 | 398/208 |
| 2016/0094292 A1* | 3/2016 | Mochizuki | H04B 10/6165 | 398/208 |
| 2016/0119064 A1* | 4/2016 | Yamaji | H04B 10/67 | 398/214 |
| 2016/0149661 A1* | 5/2016 | Huang | H04B 1/7073 | 398/74 |
| 2016/0164599 A1* | 6/2016 | Heismann | H04B 10/07953 | 398/26 |
| 2016/0261352 A1* | 9/2016 | Wen | H04B 10/532 | |
| 2016/0268981 A1* | 9/2016 | Jiang | H03F 1/083 | |
| 2019/0379462 A1* | 12/2019 | Razzell | H04B 10/6151 | |

FOREIGN PATENT DOCUMENTS

| | | |
|---|---|---|
| WO | 2016138860 A1 | 9/2016 |
| WO | 2016184301 A1 | 11/2016 |

OTHER PUBLICATIONS

Luis, et al., "Digital Self-Homodyne Detection," IEEE Photonics Technology Letters, vol. 27, No. 6, Mar. 15, 2015, pp. 608-611.

Machine Translation and Abstract of Chinese Publication No. CN106921441, Jul. 4, 2017, 10 pages.

Foreign Communication From A Counterpart Application, PCT Application No. PCT/CN2019/0751441, English Translation of International Search Report dated May 20, 2019, 5 pages.

Foreign Communication From A Counterpart Application, PCT Application No. PCT/CN2019/075\441, English Translation of Written Opinion dated May 20, 2019, 4 pages.

* cited by examiner $$I_{Ip1} = \frac{1}{2}|E_{X1}|^2 + \frac{1}{2}|E_{X2}|^2 + \frac{1}{2}E_{X1}E_{X2}^* + \frac{1}{2}E_{X2}E_{X1}^*$$

$$I_{In1} = \frac{1}{2}|E_{X1}|^2 + \frac{1}{2}|E_{X2}|^2 - \frac{1}{2}E_{X1}E_{X2}^* - \frac{1}{2}E_{X2}E_{X1}^*$$

$$I_{Ip1} - I_{In1} = 2Re\{E_{X1}E_{X2}^*\} \tag{1}$$

$$I_{Qp1} = \frac{1}{2}|E_{X1}|^2 + \frac{1}{2}|E_{X2}|^2 - \frac{1}{2}jE_{X1}E_{X2}^* + \frac{1}{2}jE_{X2}E_{X1}^*$$

$$I_{Qn1} = \frac{1}{2}|E_{X1}|^2 + \frac{1}{2}|E_{X2}|^2 + \frac{1}{2}jE_{X1}E_{X2}^* - \frac{1}{2}jE_{X2}E_{X1}^*$$

$$I_{Qp1} - I_{Qn1} = 2Im\{E_{x1}E_{X2}^*\} \tag{2}$$

$$I_{Ip2} = \frac{1}{2}|E_{Y1}|^2 + \frac{1}{2}|E_{Y2}|^2 + \frac{1}{2}E_{Y1}E_{Y2}^* + \frac{1}{2}E_{Y2}E_{Y1}^*$$

$$I_{In2} = \frac{1}{2}|E_{Y1}|^2 + \frac{1}{2}|E_{Y2}|^2 - \frac{1}{2}E_{Y1}E_{Y2}^* - \frac{1}{2}E_{Y2}E_{Y1}^*$$

$$I_{Ip2} - I_{In2} = 2Re\{E_{Y1}E_{Y2}^*\} \tag{3}$$

$$I_{Qp2} = \frac{1}{2}|E_{Y1}|^2 + \frac{1}{2}|E_{Y2}|^2 - \frac{1}{2}jE_{Y1}E_{Y2}^* + \frac{1}{2}jE_{Y2}E_{Y1}^*$$

$$I_{Qn2} = \frac{1}{2}|E_{Y1}|^2 + \frac{1}{2}|E_{Y2}|^2 + \frac{1}{2}jE_{Y1}E_{Y2}^* - \frac{1}{2}jE_{Y2}E_{Y1}^*$$

$$I_{Qp2} - I_{Qn2} = 2Im\{E_{Y1}E_{Y2}^*\} \tag{4}$$

FIG. 2A $$I_{Ip3} = \frac{1}{2}|E_{X1}|^2 + \frac{1}{2}|E_{Y2}|^2 + \frac{1}{2}E_{X1}E_{Y2}^* + \frac{1}{2}E_{Y2}E_{X1}^*$$

$$I_{In3} = \frac{1}{2}|E_{X1}|^2 + \frac{1}{2}|E_{Y2}|^2 - \frac{1}{2}E_{X1}E_{Y2}^* - \frac{1}{2}E_{Y2}E_{X1}^*$$

$$I_{Ip3} - I_{In3} = 2Re\{E_{X1}E_{Y2}^*\} \tag{5}$$

$$I_{Qp3} = \frac{1}{2}|E_{X1}|^2 + \frac{1}{2}|E_{Y2}|^2 - \frac{1}{2}jE_{X1}E_{Y2}^* + \frac{1}{2}jE_{Y2}E_{X1}^*$$

$$I_{Qn3} = \frac{1}{2}|E_{X1}|^2 + \frac{1}{2}|E_{Y2}|^2 + \frac{1}{2}jE_{X1}E_{Y2}^* - \frac{1}{2}jE_{Y2}E_{X1}^*$$

$$I_{Qp3} - I_{Qn3} = 2Im\{E_{X1}E_{Y2}^*\} \tag{6}$$

$$I_{Ip4} = \frac{1}{2}|E_{Y1}|^2 + \frac{1}{2}|E_{X2}|^2 + \frac{1}{2}E_{Y1}E_{X2}^* + \frac{1}{2}E_{X2}E_{Y1}^*$$

$$I_{In4} = \frac{1}{2}|E_{Y1}|^2 + \frac{1}{2}|E_{X2}|^2 - \frac{1}{2}E_{Y1}E_{X2}^* - \frac{1}{2}E_{X2}E_{Y1}^*$$

$$I_{Ip4} - I_{In4} = 2Re\{E_{Y1}E_{X2}^*\} \tag{7}$$

$$I_{Qp4} = \frac{1}{2}|E_{Y1}|^2 + \frac{1}{2}|E_{X2}|^2 - \frac{1}{2}jE_{Y1}E_{X2}^* + \frac{1}{2}jE_{X2}E_{Y1}^*$$

$$I_{Qn4} = \frac{1}{2}|E_{Y1}|^2 + \frac{1}{2}|E_{X2}|^2 + \frac{1}{2}jE_{Y1}E_{X2}^* - \frac{1}{2}jE_{X2}E_{Y1}^*$$

$$I_{Qp4} - I_{IQ4} = 2Im\{E_{Y1}E_{X2}^*\} \tag{8}$$

FIG. 2B

34.4GBd SP-16QAM vs. DP-16QAM

COHERENT DETECTION WITH REMOTELY DELIVERED LOCAL OSCILLATORS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present disclosure relate to the field of optical communications, and in particular, to a method and an apparatus for providing coherent detection using remotely delivered local oscillators.

BACKGROUND

A "coherent" optical transmission system is characterized by its capability to perform coherent detection. Two optical signals are coherent when the phase difference between their waves is constant, they are non-coherent if there is a random or changing phase relationship rapidly. One type of coherent signals are in-phase/quadrature signals. The "quadrature" signal differs in phase by 90 degrees from the "in-phase" or reference signal. The in-phase signal is referred to as "I," and the quadrature signal that is shifted by 90 degrees is called "Q." Coherent detection means that an optical receiver can track the phase of an optical transmitter (and hence "phase coherence") so as to extract any phase and frequency information carried by a transmitted signal.

SUMMARY

According to one aspect of the present disclosure, there is provided an integrated coherent receiver (ICR). The ICR includes an optical signal input port, a local oscillator (LO) source input port, a first polarization splitter-rotator (PSR), a second PSR, a first set of splitters, and a second set of splitters. The optical signal input port is configured to receive an optical signal. The LO source input port is configured to receive a LO source from a remote laser source. In various embodiments, both the optical signal input port and the LO source input port are polarization diversified. The first PSR is coupled to the optical signal input port. The first PSR is configured to split the optical signal into a first optical signal and a second optical signal according to a polarization of the optical signal. The second PSR is coupled to the LO source input port. The second PSR is configured to split the LO source into a first LO source and a second LO source according to a polarization of the LO source. The first set of splitters is coupled to the first PSR and is configured to receive the first and the second optical signals. The first set of splitters split the first and the second optical signals into a plurality of optical component signals, respectively. The second set of splitters is coupled to the second PSR and is configured to receive the first and the second LO sources. The second set of splitters split the first and the second LO sources into a plurality of LO component sources, respectively.

Optionally, in the preceding aspect, the first set of splitters are configured to split the first and the second optical signals in half, respectively; and the second set of splitters are configured to split the first and the second LO sources in half, respectively.

Optionally, in any of the preceding aspects, the ICR may also include a plurality of mixers, each mixer configured to receive one of the optical component signals and one of the LO component sources; and a trans-impedance amplifier (TIA) array coupled to the plurality of mixers, the TIA array comprising a plurality of linear TIAs. A gain of the TIA array may be configured to lock to a largest signal among the plurality of mixers. The ICR may also include a digital signal processor (DSP) coupled to the TIA array. The DSP is configured to receive output signals from the plurality of linear TIAs. The DSP may include a multiple-input and multiple-output (MIMO) time domain equalizer (TDEQ). The MIMO TDEQ may have various numbers of inputs and output. For example, the MIMO TDEQ may include eight inputs and two outputs, or eight inputs and four outputs.

Optionally, in any of the preceding aspects, the LO source may be received from a remote node. Optionally, in any of the preceding aspects, the optical signal and the LO source may be received from a head node that includes a laser bank. In certain embodiments, the optical signal is received in a first network direction and the LO source is received in a second network direction.

According to a second aspect of the present disclosure, a method for performing coherent detection is disclosed. The method includes the step of receiving, at an integrated coherent receiver an optical signal. The method also includes the step of receiving, at the integrated coherent receiver an LO source from a remote location. The method further includes the step of extracting, by the integrated coherent receiver, phase and frequency information carried by the optical signal using the LO source from the remote location.

Optionally, in the preceding aspect, the method includes splitting the optical signal into a first optical signal and a second optical signal according to a polarization of the optical signal; and splitting the LO source into a first LO source and a second LO source according to a polarization of the LO source. In one embodiment, the optical signal is split in half and the LO source is split in half. Optionally, the method includes splitting the first and the second optical signal into a plurality of optical component signals, respectively; and splitting the first and the second LO source into a plurality of LO component sources, respectively. Optionally, the method includes mixing each one of the optical component signals and each one of the LO component sources to generate mixed signals, and outputting the mixed signals to a trans-impedance amplifier (TIA) to generate TIA output signals, and then outputting the TIA output signals to a digital signal processor (DSP) to recover the optical signal.

The above aspects and other aspects as well as the advantages thereof are described below in the Detailed Description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2A and FIG. 2B illustrate an example of the analytical expressions for the output of each channel of the mixers in the R-RCR of FIG. 1 in accordance with an embodiment.

Figure 1:
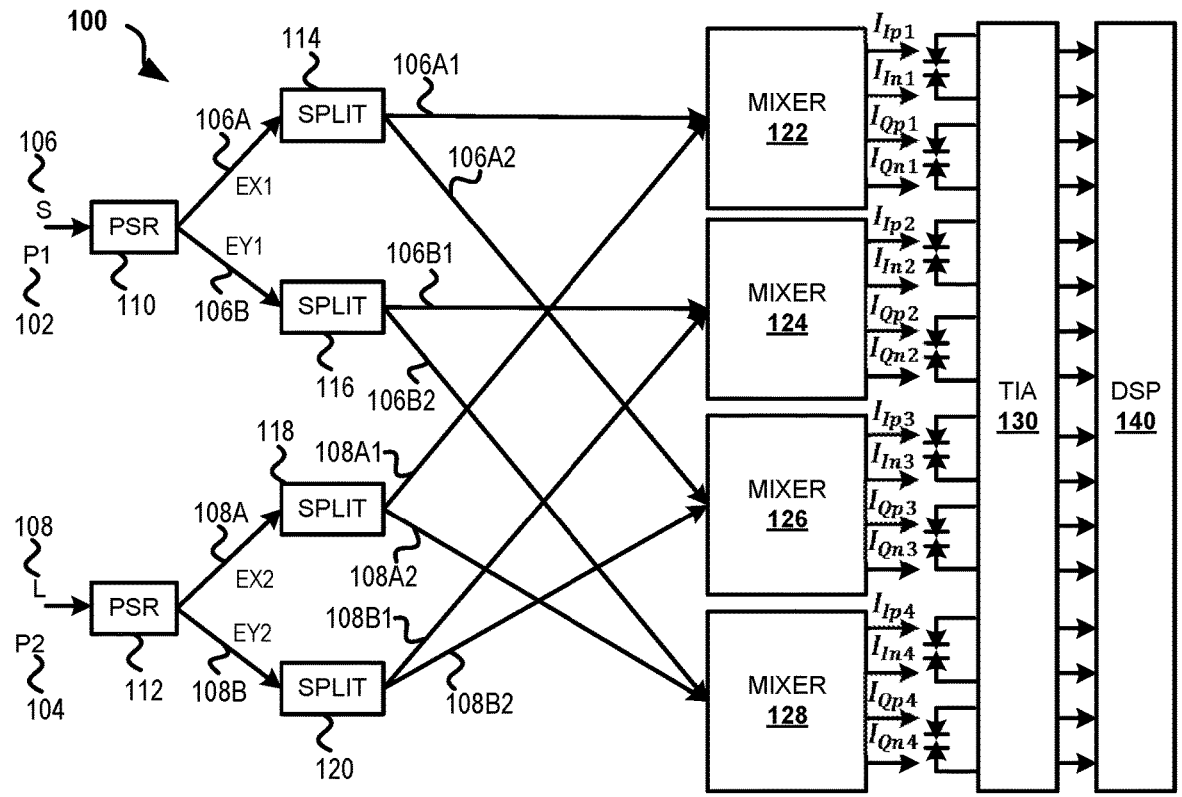
FIG. 1 is a schematic diagram illustrating an example of a remote integrated coherent receiver (R-ICR) in accordance with an embodiment.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an", and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a unit may also refer to a particular set of functions, software instructions, or circuitry that is configured to perform a specific task.

A network as referenced herein means a system of electronic devices that are joined together via communication links to enable the exchanging of information and/or the sharing of resources. Non-limiting examples of networks include local-area networks (LANs), wide-area networks (WANs), metropolitan-area networks (MANs), passive optical networks (PONs), and radio access networks (RANs). The networks may include one or more private networks and/or public networks such as the Internet. In various embodiments, the networks may employ any type of communication standards and/or protocol.

In a traditional coherent network, a single-polarization IQ requires an ICR with a built-in dense-wavelength division multiplexing (DWDM) laser (physically at the drop node) close to or of the same wavelength as a LO source to recover its phase and amplitude information for coherent detection. The disclosed embodiments provide several methods and apparatuses for performing coherent detection without the use of a built-in DWDM laser at the drop node, which may be referred to herein as a remote integrated coherent receiver (R-ICR). Thus, the disclosed R-ICR does not require a dedicated continuous wave (CW) laser source to be co-located as a LO.

In one aspect, the disclosed embodiments offer a coherent detection solution where optical local oscillators are located remotely away from the coherent receiver. Instead, it uses the same or nearly the same wavelength originated remotely. In one embodiment, the LO source is provided by a (or pair of) centralized DWDM laser bank(s) located in a head-node in the network that is able to provide one or more CW source. In various embodiments, the R-ICR design has no polarity for signal and LO source(s). Advantages of the disclosed embodiments include enabling dynamic configuration of the R-ICR according to traffic patterns, reducing the part number of ICR by half, and enabling receivers to be operated in harsh environmental conditions that are often not suitable for the presence of a coherent local oscillator, such as a wireless front-haul. Other advantages of the disclosed embodiments may also be recognized by one of ordinary skill in the art.

FIG. 1 is a schematic diagram illustrating an example of an R-ICR 100 in accordance with an embodiment. The R-ICR 100 includes two optical input ports labeled as P1 102 and P2 104. In the depicted embodiment, P1 102 is configured to receive an optical signal 106 and P2 104 is configured to receive a LO source 108. Both the P1 102 and P2 104 ports are polarization diversified. P1 102 and P2 104 are interchangeable based on a network configuration as will be discussed later in a particular embodiment. For instance, in certain embodiments, P1 102 is configured to receive the LO source 108 and P2 104 is configured to receive the optical signal 106. The output signals will have no change when swapping the input ports for the optical signal 106 and the LO source 108. Therefore, the R-ICR 100 has no polarity for signal and LO and can be configured according to traffic patterns. Thus, the R-ICR 100 may be used in both network directions, reducing the part number of ICR by half.

In the depicted embodiment, the optical signal 106 is first split by PSR 110 into an EX1 signal 106A and an EY1 signal 106B according the polarization of the optical signal 106 when received by the R-ICR 100. The LO source 108 is split by PSR 112 into an EX2 signal 108A and an EY2 signal 108B according the polarization of the LO source 108 when received by the R-ICR 100. Each of the signals is then split in half. For instance, the EX1 signal 106A is then split by an optical power splitter 114 into signals 106A1 and 106A2, each signal being equivalent to $(\sqrt{2}/2)$EX1. The EY1 signal 106B is split by an optical power splitter 116 into signals 106B1 and 106B2, each signal being equivalent to $(\sqrt{2}/2)$EY1. The EX2 signal 108A is split by an optical power splitter 118 into signals 108A1 and 108A2, each signal being equivalent to $(\sqrt{2}/2)$EX2. The EY2 signal 108B is split by an optical power splitter 120 into signals 108B1 and 108B2, each signal being equivalent to $(\sqrt{2}/2)$EY2. Thus, four distinct components for the optical signal 106 and four distinct components for the LO source 108 are generated after being optically split by the optical power splitters 114, 116, 118, and 120 respectively.

Each of the four distinct components for the optical signal 106 (signals 106A1, 106A2, 106B1, and 106B2) are then paired with one of the four distinct components for the LO source 108 (signals 108A1, 108A2, 108B1, and 108B2) and mixed using mixers 122, 124, 126, and 128. It should be noted that although FIG. 1 depicts a particular combination of inputs for the mixers 122, 124, 126, and 128, the disclosed embodiments are not limited to that specific combination of inputs for the mixers 122, 124, 126, and 128 as there may be other combinations of the signals for the optical signals (106A1, 106A2, 106B1, and 106B2) and the LO source signals (108A1, 108A2, 108B1, and 108B2). For example, the LO source signals of mixer 122 and mixer 124 may be swapped and have no impact on the final output.

In one embodiment, for single-polarization signal generated by a remote IQ modulator, all eight channels demodulate the single-polarization signal. If the coherent signal is dual polarization generated by a local IQ modulator, the disclosed embodiments also ensure that all possible polarizations are still captured by covering all the possible SOPs of the optical signal 106 and the LO source 108.

The mixers 122, 124, 126, 128 are coupled to a TIA 130. In one embodiment, the mixers 122, 124, 126, 128 may each include 2 high-speed phase detectors (PDs) and two differential output ports to the TIA 130. The TIA 130 is a current-to-voltage converter and may be used to amplify the current output to a DSP 140. The gain of the TIA 130 array can be configured to lock to the largest signal among the four mixers 122, 124, 126, 128 to prevent the situation where only one mixer has the differential signal (for example, when the polarizations of both the optical signal 106 and the LO source 108 are aligned along the same x-direction).

The DSP 140 is configured to recover the amplitude, frequency, and phase information of the optical signal 106.

Figure 3A:
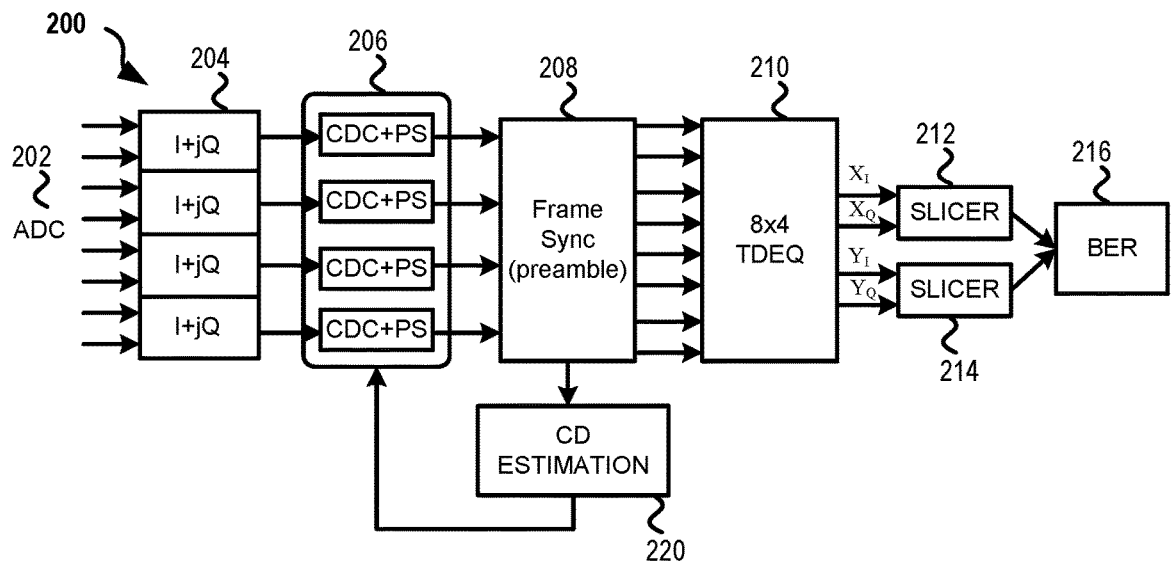
FIG. 3A is a schematic diagram illustrating a first example of a DSP of an R-ICR, where the respective transmitter offers dual polarizations (DP) data via polarization multiplexing in accordance with an embodiment.
Figure 3B:
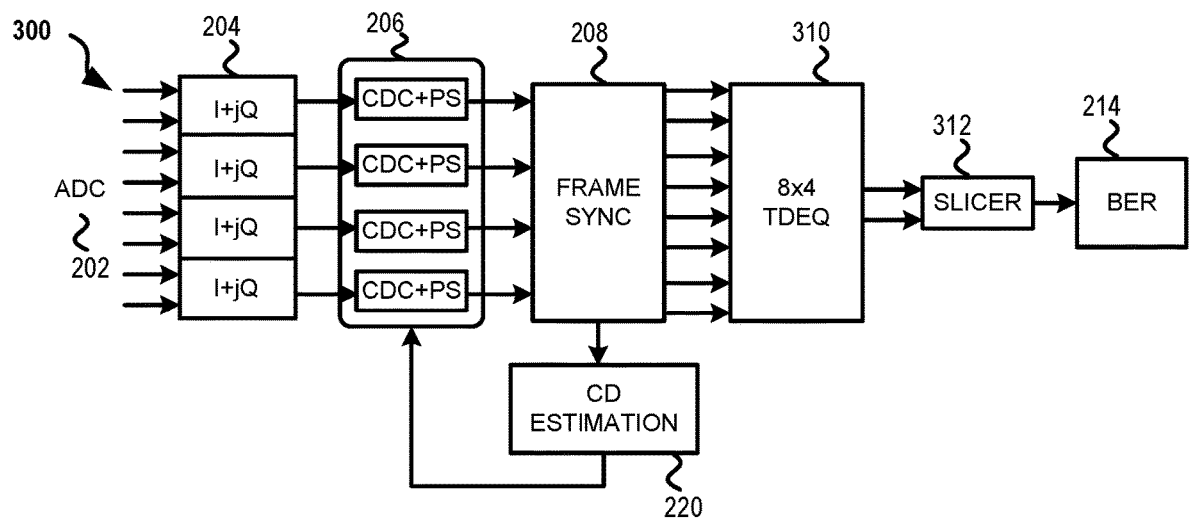
FIG. 3B is a schematic diagram illustrating a second example of a DSP of an R-ICR, where the respective transmitter offers only single polarization (SP) data without polarization multiplexing in accordance with an embodiment.

Example schematics of a DSP 140 for use in the R-ICR 100 are further described in FIGS. 3A and 3B. In one embodiment, if the silicon photonics technologies are used, all the components may be readily integrated into one/two chips with only two optical ports and eight RF ports.

FIG. 2A and FIG. 2B illustrate an example of the analytical expressions for the output of each channel of the mixers 122, 124, 126, 128 in accordance with an embodiment. For single-polarization signal where the optical signal 106 and the LO source 108 are all aligned in one direction (with the x-direction or y-direction), the expressions illustrated in FIG. 2A reduce to (1) and (2) (or (3) and (4)). If the optical signal 106 is in the x-direction, and the LO source 108 is in the y-direction (or vice versa), the expressions illustrated in FIG. 2B reduce to (5) and (6) (or (7) and (8)). When the polarization of both the optical signal 106 and the LO source 108 is at 45 degrees with respect to x-direction, the four mixers 122, 124, 126, 128 have approximately balanced output powers (assuming the P1~P2).

FIG. 3A and FIG. 3B are a schematic diagrams illustrating examples of a DSP of an R-ICR in accordance with an embodiment. Specifically, FIG. 3A illustrates a DSP 200 of an R-ICR, where the respective transmitter offers dual polarizations (DP) data via polarization multiplexing. The DSP 200 is configured to receive signals at a signal combiner unit 204 from an analog-to-digital converter (ADC) 202 that converts the analog signals to digital. The signal combiner unit 204 is a multiple-input (8-inputs), multiple-output (4-outputs) MIMO that is configured to combine the I and Q values of each signal. The signals are then outputted to a signal processing unit 206 that is configured to perform chromatic dispersion compensation (CDC) and phase shifting (PS) on the signals. The signals are then outputted to a frame synchronization unit 208 that is configured to perform frame synchronization (preamble). In one embodiment, frame synchronization is performed by correlation with the Xi/Xq/Yi/Yq of preamble. During the frame synchronization, the channel that has maximum correlation peaks to Xi/Xq/Yi/Yq is also determined, denoted as $X_I$ and $X_Q$. The initial tap of the corresponding channel with maximum peak are set to 1 ($W_I$(center, col_xi)=1, $W_Q$(center, col_xq)=1), all others are initialized as 0. The frame synchronization unit 208 outputs the signals to an 8-input, 4-output MIMO TDEQ unit 210. The frame synchronization unit 208 also sends a loopback signal to a chromatic dispersion (CD) estimation unit 220. The CD estimation unit 220 is configured to perform chromatic dispersion compensation.

The MIMO TDEQ unit 210 is configured to filter the signals in the time domain and perform carrier-phase recovery. The MIMO TDEQ unit 210 outputs a pair of signals to a slicer unit 212 and a second pair of signals to a slicer unit 214. The slicer unit 212 and the slicer unit 214 are configured as digital comparators that find the closest constellation symbol to the signal symbol, demodulate symbol, and convert symbol to binary bits, symbol-by-symbol. The slicer unit 212 and the slicer unit 214 each output a stream of data bits to a bit error rate (BER) unit 216 that is configured to compare the input bits with transmitted bits, and determine the bit error rate.

Referring now to FIG. 3B, a DSP 300 of an R-ICR, where the respective transmitter offers only single polarization (SP) data without polarization multiplexing is presented in accordance with an embodiment. The difference between the DSP 300 for single-polarization modulation and the DSP 200 for dual-polarization signals depicted in FIG. 3A, is that because the signals are only single-polarization, the DSP 300 has an 8-input, 2-output MIMO TDEQ unit 310 that feeds into a single slicer unit 312 as opposed to the 8-input, 4-output MIMO TDEQ unit 210 that feeds into the slicer unit 212 and the slicer unit 214 in the DSP 200 for dual-polarization signals.

Figure 4:
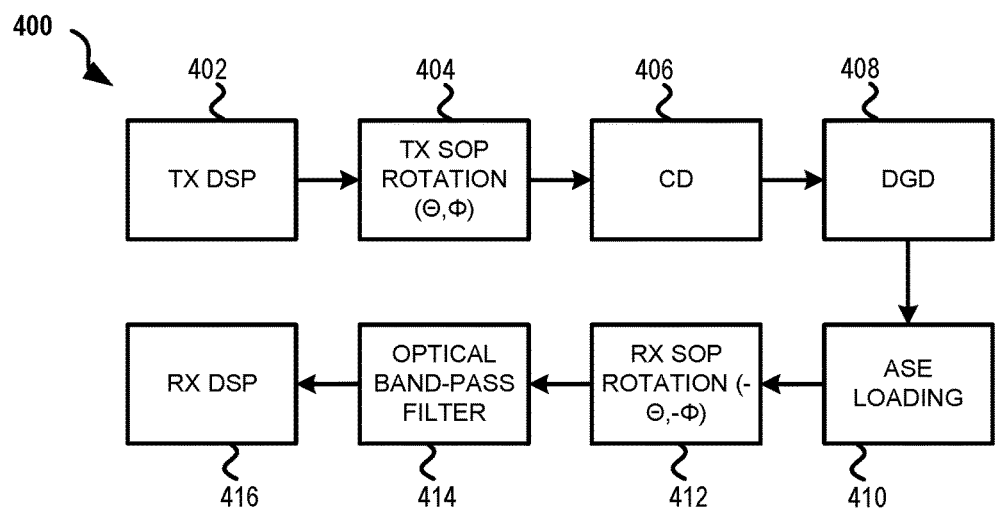
FIG. 4 is a schematic diagram illustrating an example of a channel model in accordance with an embodiment.

FIG. 4 is a schematic diagram illustrating an example of a channel model 400 in accordance with an embodiment. The channel model 400 starts with the signals being processed by a TX DSP unit 402. The TX DSP unit 402 is configured to modify the signal to obtain a desired performance. For example, the TX DSP unit 402 may be used to modify the data that goes into the transmitter to optimize bandwidth, configuring the signal to peak at a certain frequency, or make other adjustments to obtain a desired BER.

The TX DSP unit 402 forwards the signal to a TX SOP rotation unit 404 that is configured to set the state of polarization of the transmitter and introduce rotation into the channel. The TX SOP rotation unit 404 forwards the signal to a CD unit 406 that is configured to perform dispersion compensation (e.g., canceling the chromatic dispersion of some optical element(s)). Chromatic dispersion is the spreading of a light pulse during transmission. The CD unit 406 forwards the signal to a differential-group-delay (DGD) unit 408 that is configured to perform group delay compensation. Group delay is the time delay of the amplitude envelopes of the various sinusoidal components of a signal through a device and is a function of frequency for each component.

The DGD unit 408 forwards the signal to an amplified spontaneous emission (ASE) loading unit 410. The ASE loading unit 410 is configured to perform optical noise by amplifying spontaneously emitted radiation (luminescence). The ASE loading unit 410 forwards the signal to a RX SOP rotation unit 412. The RX SOP rotation unit 412 is configured to introduce a local oscillator rotation. The signal is then passed through an optical band-pass filter (OBPF) unit 414. In one embodiment, the OBPF unit 414 is configured to apply an 8th order Gaussian filter with 3-dB bandwidth of 45 gigahertz (GHz) to filter the signal. The signal is then passed to the RX DSP 416 to recover the amplitude, frequency, and phase information of the signal.

Figure 5:
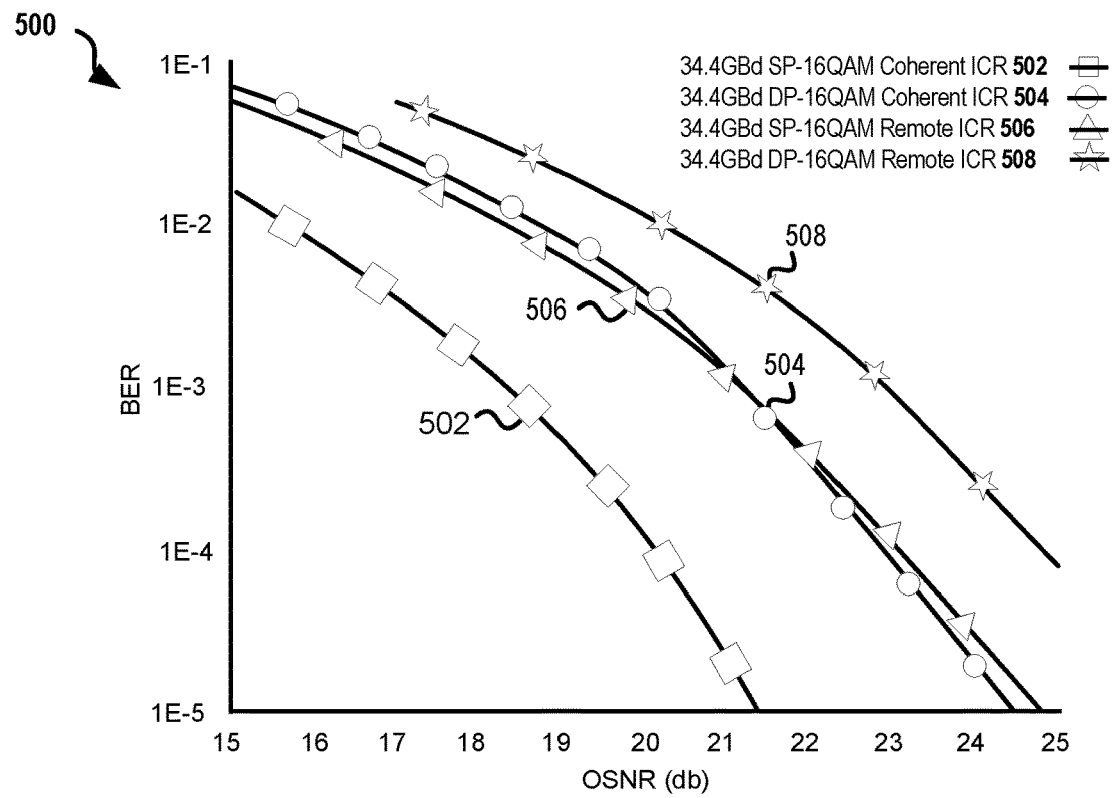
FIG. 5 is a bit error rate (BER) vs optical signal-to-noise ratio (OSNR) simulated graph for a 16 quadrature amplitude modulation (QAM) signal for both single and dual polarization multiplexing in accordance with an embodiment.

FIG. 5 is a BER vs OSNR simulated graph 500 for a 16QAM signal for both single and dual polarization multiplexing in accordance with an embodiment. The BER vs OSNR simulated graph 500 includes a curve 502 using a 34.4 gigabaud (GBd) single-polarization (SP)-16QAM Coherent ICR (i.e., a traditional RCR with a locally located local oscillator source), a curve 504 using a 34.4 GBd dual-polarization (DP)-16QAM Coherent ICR, a curve 506 using a 34.4 GBd SP-16QAM R-ICR (i.e., an ICR with a remote LO source as disclosed herein), and a curve 508 using a 34.4 GBd DP-16QAM Remote ICR. For the single-polarization modulation, the curve 502 and the curve 506 show that the R-ICR offers a required OSNR (rOSNR) of about 3 dB worse than that from the traditional RCR if the LO uses the same laser source by which the signal is generated. This degradation in performance is a direct result of OSNR introduced in the LO from the assumed same location of the transmitter in the calculation. In the case of DP modulation, the curve 504 and the curve 508 show about 1.5 dB penalty at BER threshold of 1e-2.

Figure 6:
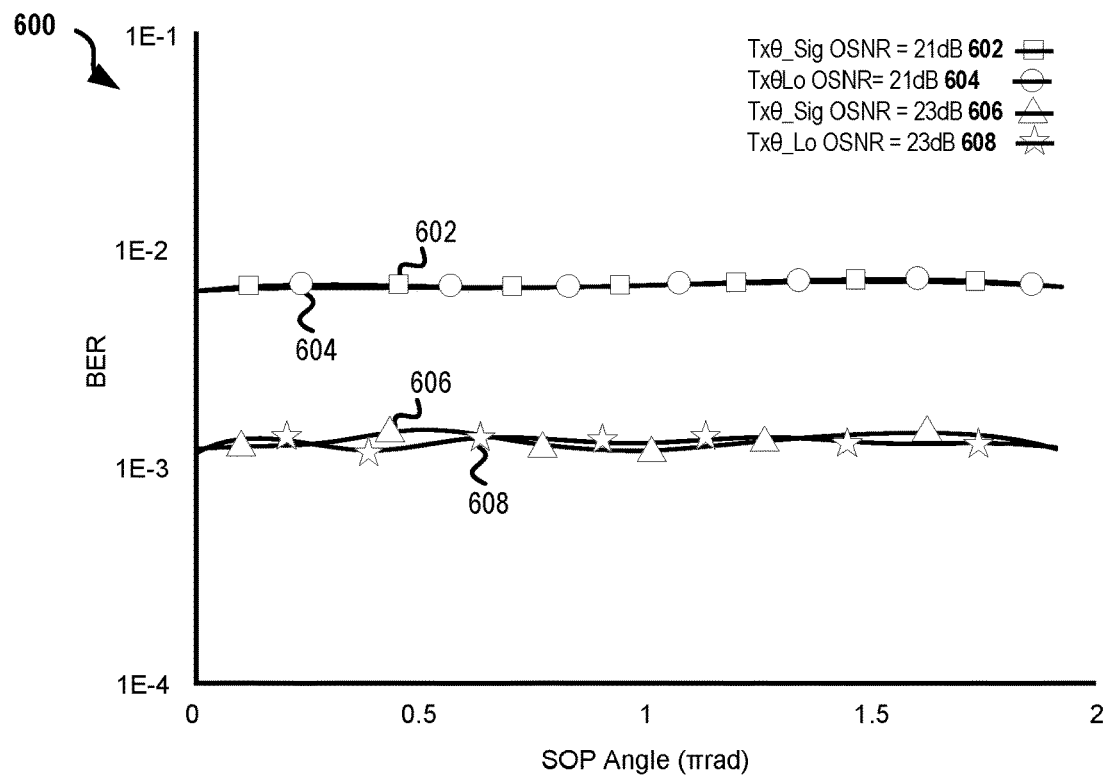
FIG. 6 is a BER vs state-of-polarization (SOP) angle simulated graph in accordance with an embodiment.

FIG. 6 is a BER vs SOP angle simulated graph 600 for DP 16QAM at 34.4 Gbd in accordance with an embodiment. The BER vs SOP angle simulated graph 600 includes a curve 602 for a signal having a transmitter SOP angle OSNR set to 21 dB, a curve 604 for a local oscillator having a transmitter SOP angle OSNR set to 21 dB, a curve 606 for a signal having a transmitter SOP angle OSNR set to 23 dB, and a curve 608 for a local oscillator having a transmitter SOP angle OSNR set to 23 dB. As shown in the FIG. 6, there is no significant impact of SOP angle on the performance of R-ICR.

Figure 7A:
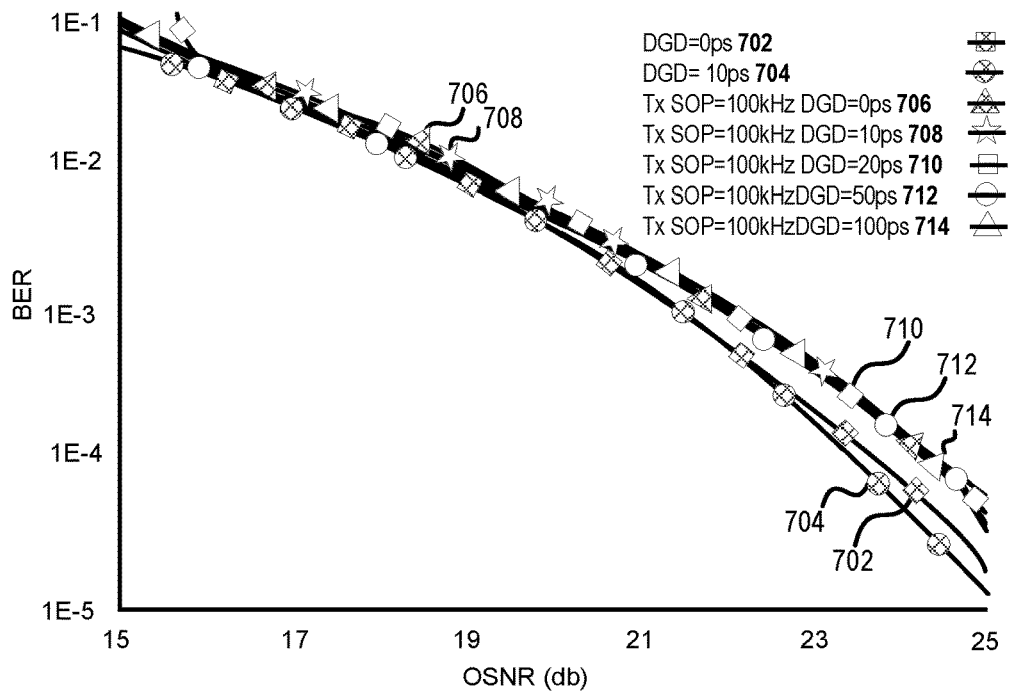
FIG. 7A is a BER vs OSNR simulated graph of an R-ICR for a single-polarization 16QAM signal with a SOP rotation on the transmitter (TX) side in accordance with an embodiment.
Figure 7B:
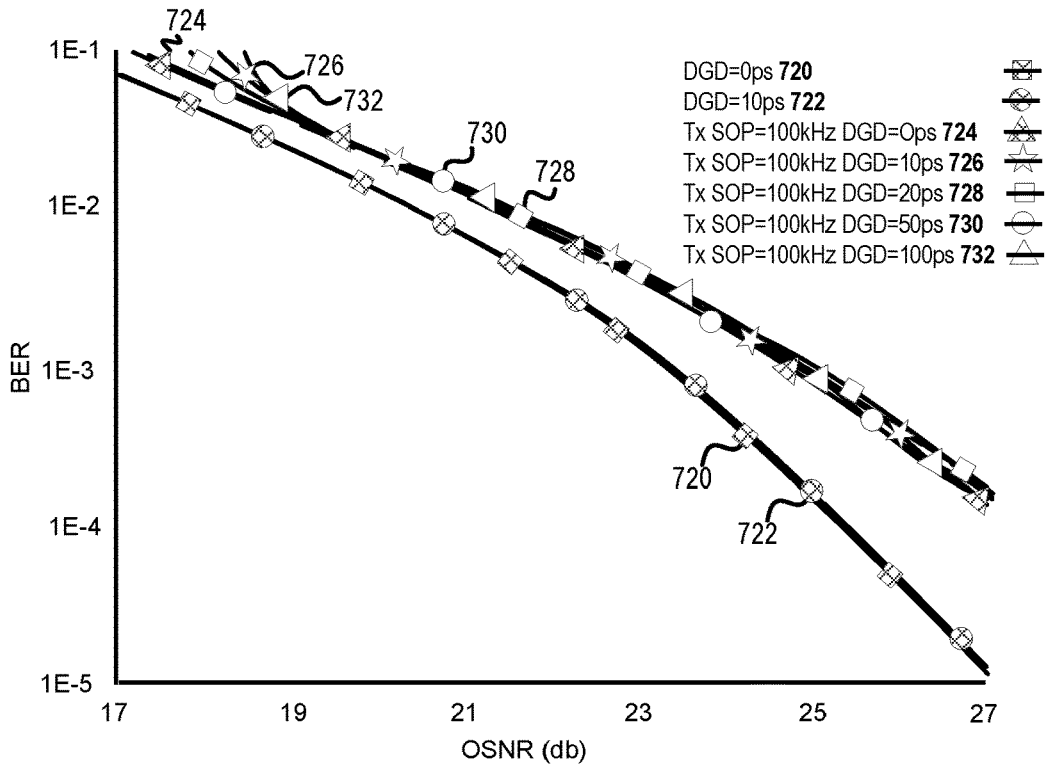
FIG. 7B is a BER vs OSNR simulated graph of an R-ICR for a dual-polarization 16QAM signal with a SOP rotation on the TX side in accordance with an embodiment.
Figure 8A:
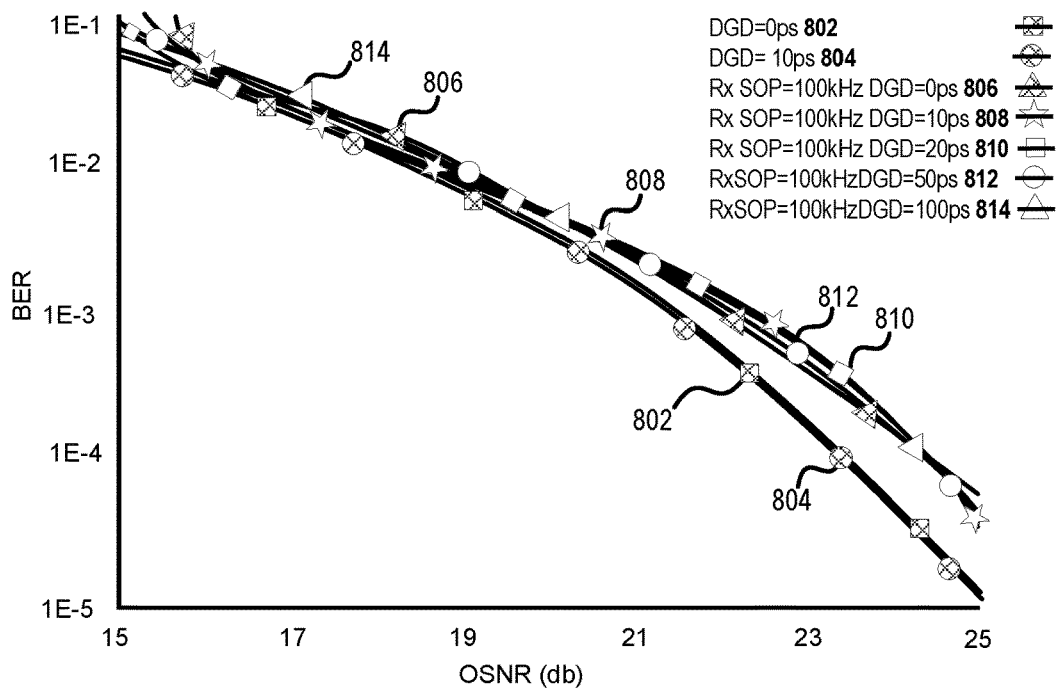
FIG. 8A is a BER vs OSNR simulated graph of an R-ICR for a single-polarization 16QAM signal with a SOP rotation on the receiver (RX) side in accordance with an embodiment.
Figure 8B:
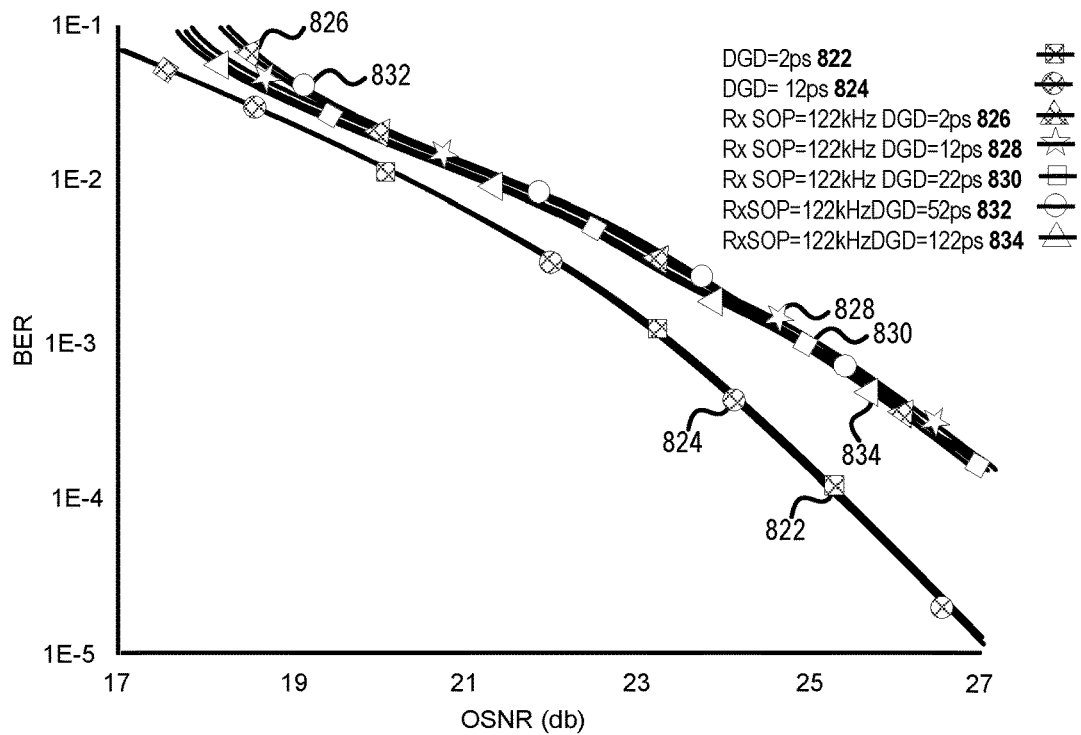
FIG. 8B is a BER vs OSNR simulated graph of an R-ICR for a dual-polarization 16QAM signal with a SOP rotation on the RX side in accordance with an embodiment.

FIG. 7A is a BER vs OSNR simulated graph of an R-ICR for SP 16QAM signal with a SOP rotation on the TX side in accordance with an embodiment. FIG. 7B is a BER vs OSNR simulated graph of an R-ICR for DP 16QAM signal with SOP rotation on the TX side in accordance with an embodiment. FIG. 8A is a BER vs OSNR simulated graph of an R-ICR for SP 16QAM signal with a SOP rotation on the RX side in accordance with an embodiment. FIG. 8B is a BER vs OSNR simulated graph of an R-ICR for DP 16QAM signal with a SOP rotation on the RX side in accordance with an embodiment. In the depicted embodiments, the baud rate used in the simulation is 34.4G.

Analyzing the results of the simulations in FIGS. 7A, 7B, 8A, and 8B indicates that DGD of the TX has no noticeable impact on the performance as long as the preamble is properly designed and TDEQ tap length is sufficiently long. The same conclusion is applicable to DGD of the RX as well. Similarly, no noticeable difference is observed of SOP for both the TX and the RX, making the R-ICR fully symmetric with respect to SOP. The simulations in FIGS. 7A, 7B, 8A, and 8B also indicate that the tolerance of SOP rotation is worse for DP-16QAM than SP-16QAM for the disclosed R-ICR.

Figure 9:
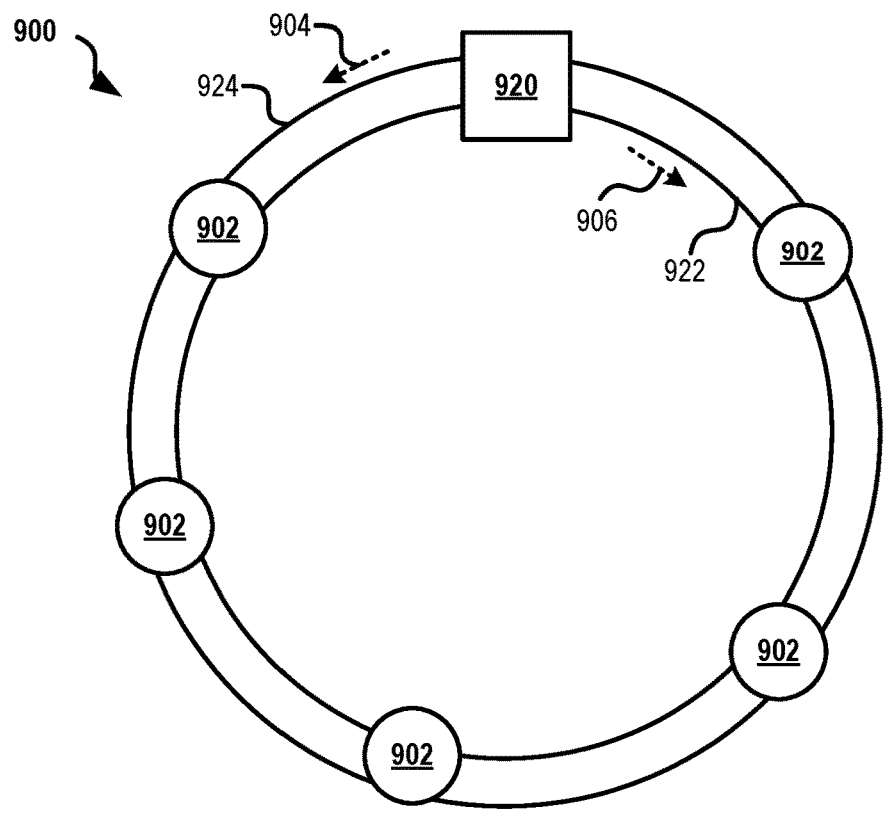
FIG. 9 is a schematic diagram illustrating an example of a ring network with a centralized laser bank at a head end in accordance with an embodiment.

FIG. 9 is a schematic diagram illustrating an example of a ring network 900 with a centralized laser bank at a head end 920 in accordance with an embodiment. In one embodiment, the head end 920 includes a DWDM laser bank along with IQ modulators for each traffic direction in the ring network 900. In one embodiment, because the laser bank and modulators are located in the same site and often on the same rack in a well-controlled environment, these modulators can operate as DP modulators with polarization maintaining fiber as input. As a result, the downstream traffic from head node to satellite nodes may be all DP signals. Therefore, under the identical modulation format, it doubles the downstream data rate.

The satellite nodes 902 each contain an R-ICR as disclosed herein along with remote IQ modulators (IQM). The signal is provided by the head end 920 to the satellite nodes 902 in a first network direction 904 using a first fiber line 924. The local oscillator at the satellite nodes 902 is also provided by the head end 920 in an opposite direction 906 with a second fiber line 922. The local oscillator may be the same or similar wavelength as the traffic signal. In one embodiment, second fiber line 922 may also provide a laser source for the remote IQ modulator to generate bi-directional communication signals. In other words, both traffic signals and LO come from the remote laser banks at the head end 920.

As described above, because the R-ICR has no polarity for the optical signal and the LO source, the R-ICR may be configured according to traffic patterns. Thus, the same R-ICR may be used on both the west and the east side of the network traffic as it does not require the matching of polarity such as a fixed signal or LO port. As such, the disclosed R-ICR supports dynamic provisioning and is capable of switching from west-to-east operation to east-to-west operation (and vice versa) without any hardware reconfiguration.

Figure 10:
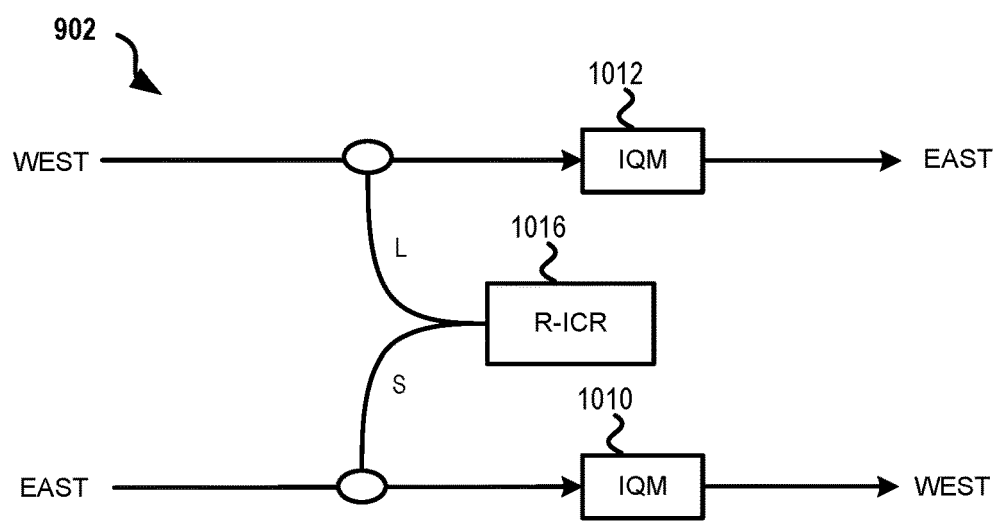
FIG. 10 is a schematic diagram illustrating an example of a node in the ring network of FIG. 9 in accordance with an embodiment.

FIG. 10 is a schematic diagram illustrating an example of a satellite node 902 in the ring network 900 in accordance with an embodiment. In one embodiment, for west to east traffic, a CW light from the head end 920 is split at a desired ratio. One portion of the CW light is transmitted to an R-ICR 1016 of the satellite node 902 to serve as a LO. The remaining portion of the CW light is fed into an IQM 1012 to generate traffic for the satellite node 902. The opposite traffic (east to west) that carries data from a downstream node that arrives at the satellite node 902 is also split in the same way and fed into the same R-ICR 1016 for detection, with the remaining portion of the modulated light being terminated at an IQM 1010 that is optional in case (east to west) traffic generation originates at the satellite node 902. Therefore, both traffic and LO come from remote laser banks, eliminating the need of a locally built-in LO. The same ICR can be used on the east side as it does not require the matching of polarity such as fixed signal or LO port.

Figure 11:
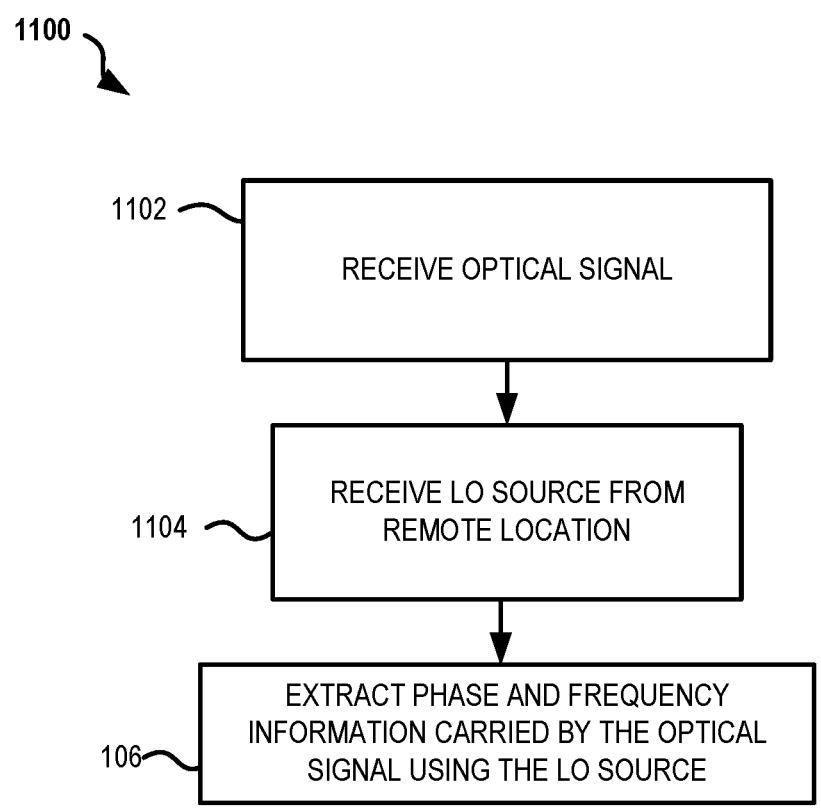
FIG. 11 is a flowchart diagram illustrating an example of a method for performing coherent detection in accordance with an embodiment.
Figure 11:
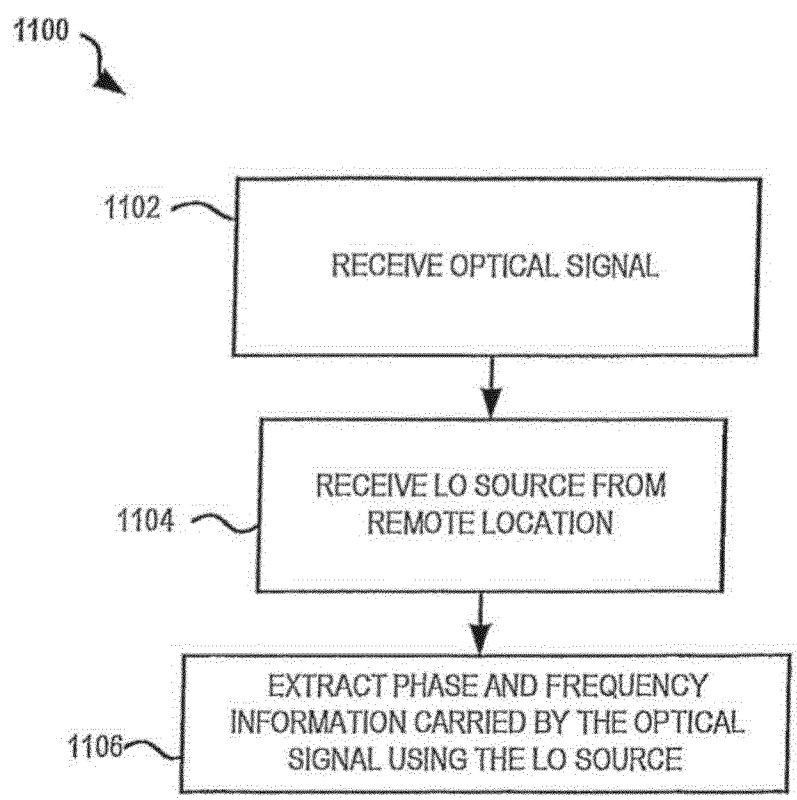

FIG. 11 is a flowchart diagram illustrating an example of a method 1100 for performing coherent detection in accordance with an embodiment. The method 1100 may be performed by an embodiment of an R-ICR as disclosed herein. The method 1100 starts by receiving an optical signal at step 1102. In one embodiment, the optical signal is received from a head node. At step 1104, the method 1100 receives an LO source from remote location. In one embodiment, the LO source is also received from the head node. In one embodiment, the optical signal is received from the head node in a first network traffic direction and the LO source is received from the head node in a second network traffic direction. For example, the optical signal may be received via a first fiber line and the LO source may be received via a second fiber line. The optical signal and the LO source may have the same wavelength. The head may include a centralized laser bank and IQMs in both the first network traffic direction and the second network traffic direction. At step 1106, the method 1100 extracts phase and frequency information carried by the optical signal using the LO source received from the remote location.

Accordingly, the disclosed embodiments provide an R-ICR that eliminates the need for a built-in local oscillator. Instead, the disclosed embodiments use the same or nearly the same wavelength originated from a remote source such as a centralized laser bank located in head-node as LO. The disclosed embodiments allow receivers to be operated in harsh environmental conditions often not suitable for the presence of coherent local oscillator, such as a wireless front-haul. For example, the R-ICR plus a remote IQM is able to offer the link bandwidth without the presence of additional fibers for the delivery of LO, thus simplifying considerably the network configuration as well as providing a cost reduction. In addition, the new remote ICR is designed so that it has no polarity for signal and LO and can be configured according to traffic patterns, which reduces the types of ICR that need to be produced by half in comparison to the networks where direct detection is used as the same ICR may be used in both direction. Therefore, the system cost and management complexity are reduced significantly with the new coherent detection solution.

Additionally, although the disclosed R-ICR contains four mixers, in certain embodiments, the mixers may be shared by two directions. In each direction, the R-ICR uses only two mixers, similar to a regular ICR with built-in LO. The other two mixers even though not used for additional detection, may provide the possibility of dynamic switching of the traffic from LO function to signal detection function. As long as the same wavelength is used for bidirectional communications, the disclosed R-ICR is capable of supporting both west and east sides regardless of the traffic patterns in the networks.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An integrated coherent receiver (ICR) comprising:
   an optical signal input port configured to receive an optical signal;
   a local oscillator (LO) source input port configured to receive a LO source from a remote laser source;
   a first polarization splitter-rotator (PSR) coupled to the optical signal input port, the first PSR configured to split the optical signal into a first optical signal and a second optical signal according to a polarization of the optical signal;
   a second PSR coupled to the LO source input port, the second PSR configured to split the LO source into a first LO source and a second LO source according to a polarization of the LO source;
   a first set of splitters coupled to the first PSR, the first set of splitters configured to receive the first and the second optical signals, respectively, and to split the first and the second optical signals into a plurality of optical component signals, respectively, the first set of splitters being positioned upstream of a plurality of mixers, each mixer having two differential output ports; and
   a second set of splitters coupled to the second PSR, the second set of splitters configured to receive the first and the second LO sources, respectively, and to split the first and the second LO sources into a plurality of LO component sources.

2. The ICR of claim 1, wherein both the optical signal input port and the LO source input port are polarization diversified.

3. The ICR of claim 1, wherein the first set of splitters are configured to split the first and the second optical signals in half, respectively; and the second set of splitters are configured to split the first and the second LO sources in half, respectively.

4. The ICR of claim 3, wherein each mixer from the plurality of mixers is configured to receive one of the optical component signals and one of the LO component sources.

5. The ICR of claim 4, wherein each set of splitters comprises two splitters and the number of the plurality of mixers is four.

6. The ICR of claim 4, wherein the optical signal and the LO source are received from a head node of a ring network, the head node comprising a laser bank.

7. The ICR of claim 6, wherein the optical signal is received in a first network direction and the LO source is received in a second network direction.

8. The ICR of claim 4, further comprising a trans-impedance amplifier (TIA) array coupled to the plurality of mixers, the TIA array comprising a plurality of linear TIAs.

9. The ICR of claim 8, wherein a gain of the TIA array is configured to lock to a largest signal among the plurality of mixers.

10. The ICR of claim 8, further comprising a digital signal processor (DSP) coupled to the TIA array, the DSP configured to receive output signals from the plurality of linear TIAs.

11. The ICR of claim 10, wherein the DSP comprises a multiple-input and multiple- output (MIMO) time domain equalizer (TDEQ).

12. The ICR of claim 11, wherein the MIMO TDEQ comprises eight inputs and two outputs.

13. The ICR of claim 11, wherein the MIMO TDEQ comprises eight inputs and four outputs.

14. The ICR of claim 1, wherein the second set of splitters is upstream of the plurality of mixers.

15. A method for performing coherent detection, the method comprising:
receiving, at an integrated coherent receiver, an optical signal;
receiving, at the integrated coherent receiver, a local oscillator (LO) source from a remote location;
extracting, by the integrated coherent receiver, phase and frequency information carried by the optical signal using the LO source from the remote location;
splitting the optical signal into a first optical signal and a second optical signal according to a polarization of the optical signal using a first polarization splitter-rotator (PSR);
splitting the LO source into a first LO source and a second LO source according to a polarization of the LO source using a second PSR;
splitting the first optical signal and the second optical signal into a plurality of optical component signals using a first set of splitters;
splitting the first LO source and the second LO source into a plurality of LO component sources using a second set of splitters; and
providing the plurality of optical component signals and the plurality of LO component sources to a plurality of mixers, each mixer having two differential output ports, the first set of splitters and the second set of splitters upstream of the plurality of mixers.

16. The method of claim 15, wherein the optical signal is split in half and the LO source is split in half.

17. The method of claim 15, wherein extracting the phase and frequency information comprises mixing each one of the optical component signals and each one of the LO component sources to generate mixed signals.

18. The method of claim 17, wherein extracting the phase and frequency information comprises outputting the mixed signals to a trans-impedance amplifier (TIA) to generate TIA output signals.

19. The method of claim 18, wherein extracting the phase and frequency information comprises outputting the TIA output signals to a digital signal processor (DSP) to recover the optical signal.

20. The method of claim 15, further comprising providing output signals from the plurality of mixers to a trans-impedance amplifier (TIA) array coupled to the plurality of mixers, the TIA array comprising a plurality of linear TIAs.

21. The method of claim 20, further comprising providing output signals from the plurality of linear TIAs to a digital signal processor (DSP) coupled to the TIA array.

* * * * *

UNITED STATES PATENT AND TRADEMARK OFFICE
CERTIFICATE OF CORRECTION

PATENT NO.         : 10,651,947 B2
APPLICATION NO.    : 15/900233
DATED              : May 12, 2020
INVENTOR(S)        : Xiao Andy Shen et al.

Page 1 of 2

It is certified that error appears in the above-identified patent and that said Letters Patent is hereby corrected as shown below:

On the Title Page

Page 2, Column 2, Item (56), Other Publications, Lines 5-7, should read:
Foreign Communication From A Counterpart Application, PCT Application No. PCT/CN2019/075\441, English Translation of International Search Report dated May 20, 2019, 5 pages.

In the Drawings

Replace Sheet 9 (FIG. 11) with the following Sheet 9 (FIG. 11):

Signed and Sealed this
Thirtieth Day of June, 2020

Andrei Iancu
*Director of the United States Patent and Trademark Office*